United States Patent
Fan

(10) Patent No.: US 11,153,304 B2
(45) Date of Patent: Oct. 19, 2021

(54) UNIVERSAL GROUP SUPPORT FOR AUTHENTICATION SYSTEMS

(71) Applicant: CITRIX SYSTEMS, INC., Fort Lauderdale, FL (US)

(72) Inventor: Tian Fan, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 171 days.

(21) Appl. No.: 15/950,323

(22) Filed: Apr. 11, 2018

(65) Prior Publication Data
US 2019/0319946 A1 Oct. 17, 2019

(51) Int. Cl.
*H04L 29/06* (2006.01)
*H04L 9/32* (2006.01)

(52) U.S. Cl.
CPC ........ *H04L 63/0853* (2013.01); *H04L 9/3213* (2013.01); *H04L 63/104* (2013.01)

(58) Field of Classification Search
CPC ..... H04L 63/08; H04L 63/0807; H04L 63/20; H04L 63/10; H04L 63/0815; H04L 63/104; H04L 63/0853; H04L 9/3213; G06F 21/31; G06F 21/335
See application file for complete search history.

(56) References Cited

U.S. PATENT DOCUMENTS

| | | | | |
|---|---|---|---|---|
| 7,103,784 B1 * | 9/2006 | Brown | ................ | G06F 21/6218 713/151 |
| 8,225,385 B2 * | 7/2012 | Chow | .................. | H04L 9/3271 726/8 |
| 9,176,744 B2 | 11/2015 | Lee | | |
| 9,426,155 B2 * | 8/2016 | Chao | ....................... | H04L 63/10 |
| 9,538,345 B2 | 1/2017 | Sah et al. | | |
| 2007/0118891 A1 * | 5/2007 | Buer | ....................... | G06Q 20/24 726/8 |
| 2007/0162581 A1 * | 7/2007 | Maes | ................. | H04L 29/12047 709/223 |
| 2007/0226785 A1 * | 9/2007 | Chow | ................ | H04W 12/0804 726/8 |
| 2009/0328178 A1 * | 12/2009 | McDaniel | ........... | H04L 63/0884 726/9 |
| 2011/0145565 A1 * | 6/2011 | Koi | ........................ | H04L 9/3271 713/155 |

(Continued)

*Primary Examiner* — Carl G Colin
*Assistant Examiner* — Andrew Suh
(74) *Attorney, Agent, or Firm* — Allen, Dyer, Doppelt + Gilchrist, PA

(57) ABSTRACT

A central authentication service is for authentication of a user operating a computing device requesting access to a service provider. The central authentication service stores a universal group that includes principals from different types of identity providers, with the user of the computing device included as one of the principals. An access token generated by an identity provider associated with the computing device is received by the central authentication service. The central authentication service generates a universal token that includes group membership information for the universal group, and exchanges the access token with the universal token. The universal token is provided to the service provider, with the group membership information on the universal token to allow the service provider to determine if the user of the computing device has permission to access desired services.

20 Claims, 6 Drawing Sheets

(56) References Cited

U.S. PATENT DOCUMENTS

| | | | |
|---|---|---|---|
| 2014/0373099 A1* | 12/2014 | Durbha | H04L 63/10 |
| | | | 726/4 |
| 2015/0149530 A1* | 5/2015 | Maret | H04L 67/2814 |
| | | | 709/203 |
| 2015/0381606 A1* | 12/2015 | Srivastav | H04L 67/16 |
| | | | 726/4 |
| 2017/0264612 A1* | 9/2017 | Kaushal | H04L 63/168 |
| 2019/0044940 A1* | 2/2019 | Khalil | H04L 9/3263 |
| 2019/0058707 A1* | 2/2019 | Chung | H04L 63/0807 |
| 2019/0228178 A1* | 7/2019 | Sharma | G06K 19/06037 |
| 2019/0229178 A1* | 7/2019 | Ota | H01L 27/3276 |
| 2019/0366183 A1* | 12/2019 | Ball | A63B 69/3667 |

\* cited by examiner

UNIVERSAL GROUP SUPPORT FOR AUTHENTICATION SYSTEMS

TECHNICAL FIELD

The present disclosure relates to authentication systems, and more particularly, to a universal token that includes group membership information on members from different identity providers.

BACKGROUND

Service providers that provide Software as a Service (SaaS) and other various cloud services are very popular with Internet users. Before a user of a computing device can access a service provider, the user needs to be authenticated. For authentication, the service provider redirects the computing device to an identity provider.

The user of the computing device usually can choose their identity provider, such as Active Directory, Google, Facebook, or Okta, for example. Each identity provider has an authentication protocol associated therewith, such as OAuth, OpenID Connect (OIDC), Security Markup Language (SAML), or Active Directory Federation Services (ADFS), for example. If authentication of the user is successful, the identity provider generates an access token and provides a corresponding authentication code to the computing device. The computing device provides the authentication code to the service provider, and the service provider will use the authentication code to get the access token from the identity provider. The service provider will permit access by the user's computing device after validation of the access token.

It is common for different users to choose different identity providers. However, this flexibility brings a challenge to the service provider: how to provide group based delegation administration across different identity providers without expending much effort to build various sub-systems to support different identity providers.

SUMMARY

A central authentication service is for authentication of a user operating a computing device requesting access to a service provider. The central authentication service may comprise a memory, and a processor coupled to the memory. At least one universal group that includes a plurality of principals from different types of identity providers may be stored in the memory, with a user of the computing device included as one of the principals.

The processor may be configured to receive an access token generated by an identity provider associated with the computing device, generate a universal token that includes group membership information for the at least one universal group, and exchange the access token with the universal token. An authentication code may be provided to the computing device, with the computing device then providing the authentication code to the service provider. The universal token may be provided to the service provider upon receipt of the authentication code from the service provider. The group membership information on the universal token is to allow the service provider to determine if the user of the computing device has permission to access desired services.

The access token received by the central authentication service may be generated by anyone of the different types of identity providers associated with the at least one universal group. By replacing the access token with the universal token, this allows the service provider to contact the central authentication service for the universal token to determine if the user has permission to access the desired services instead of contacting a particular identity provider that initially generated the access token. This simplifies operation of the service provider since the service provider does not have to keep track of the many different types of identity providers. Now, the service provider is able to contact the central authentication service for the universal token regardless of the identity provider that generated the initial access token. The central authentication service avoids having to provide various subsystems to support the many different types of identity providers.

The central authentication service essentially operates as a broker by instructing the computing device to authenticate with its associated identity provider, and then replace the access token generated by the identity provider with the universal token. The central authentication service advantageously allows a system administrator, for example, to provide group based delegation administration across different identity providers. This may be accomplished by having one type device, i.e., the central authentication service, allow for such a grouping of members across the different types of identity providers.

In one embodiment, the identity provider provides the authentication code to the computing device, and the computing device then provides the authentication code to the processor. The processor may be further configured to provide the authentication code to the identity provider in exchange for the access token from the identity provider.

In another embodiment, the computing device receives the access token from the identity provider after authentication with the identity provider, and the processor may then receive the access token from the computing device.

The universal token may be based on a universal authentication protocol, and an authentication protocol used by the identity provider to generate the access token may be different from the universal authentication protocol. Alternatively, the authentication protocol used by the identity provider to generate the access token may be the same as the universal authentication protocol.

The processor may be further configured to encrypt the universal token. The encryption may be based on at least one of public/private key pair encryption, shared key encryption, and JSON Web Encryption (JWE).

Another aspect is directed to a method for operating a central authentication service for authentication of a user operating a computing device requesting access to a service provider. The method comprises storing at least one universal group that includes a plurality of principals from different identity providers, with the user of the computing device included as one of the principals; receiving an access token generated by an identity provider associated with the computing device; generating a universal token that includes group membership information for the at least one universal group; exchanging the access token with the universal token; and providing an authentication code to the computing device, with the computing device then providing the authentication code to the service provider. The universal token is provided to the service provider upon receipt of the authentication code from the service provider, with the group membership information on the universal token to allow the service provider to determine if the user of the computing device has permission to access desired services.

Yet another aspect is directed to a non-transitory computer readable medium for a central authentication service used in authenticating a user operating a computing device requesting access to a service provider, with the non-transitory computer readable medium having a plurality of computer executable instructions for causing the central authentication service to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
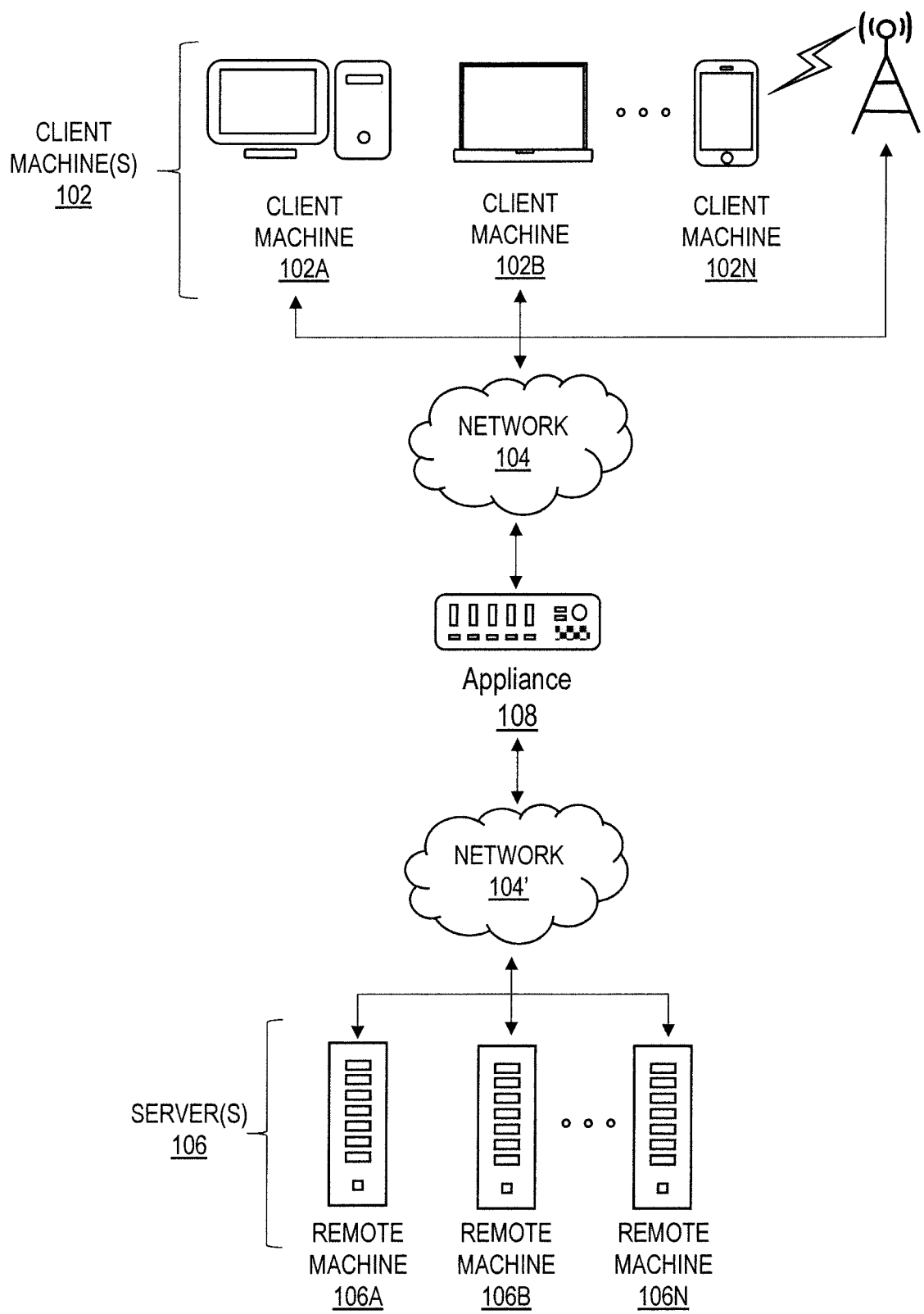
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
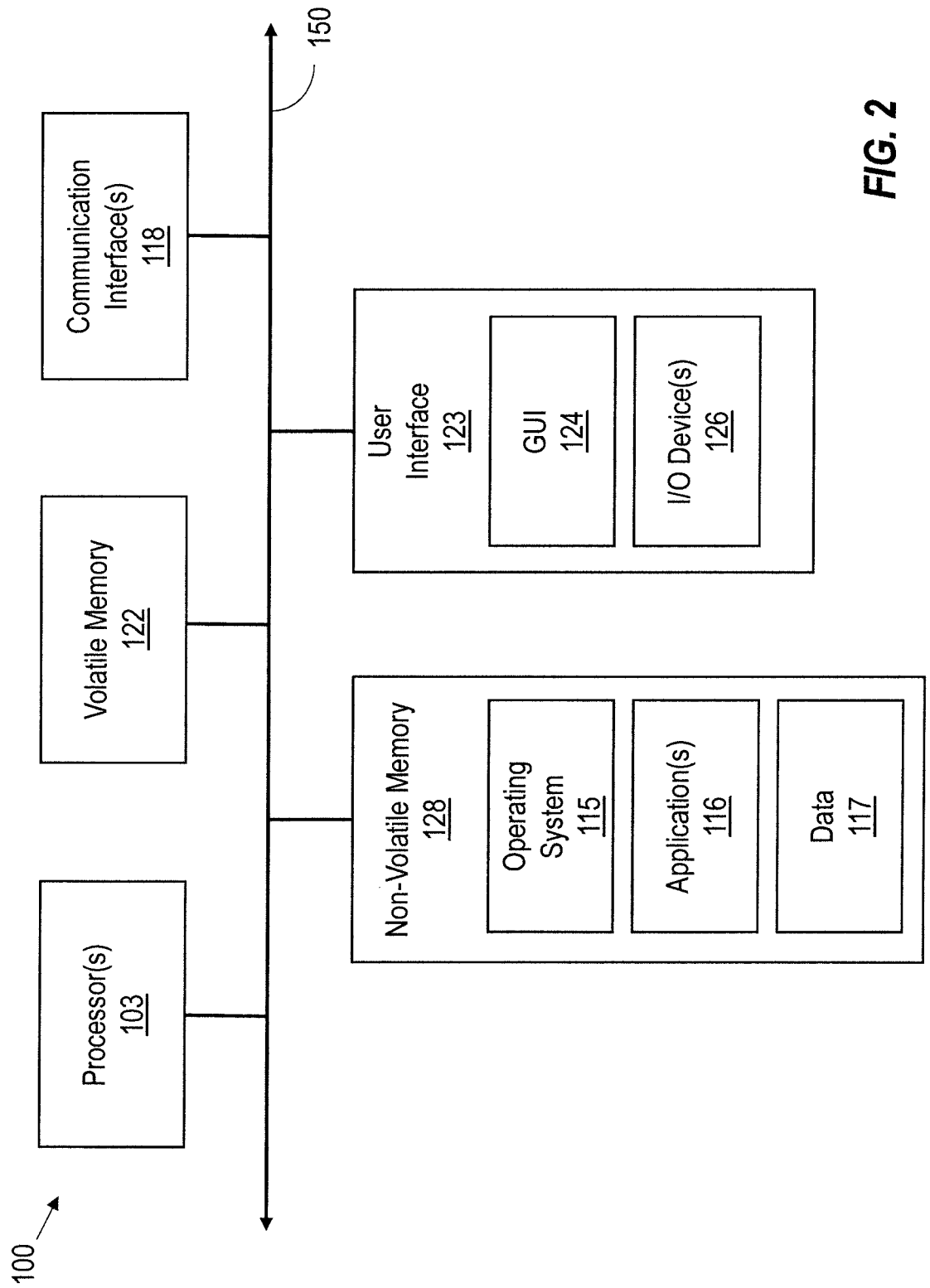
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute. Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
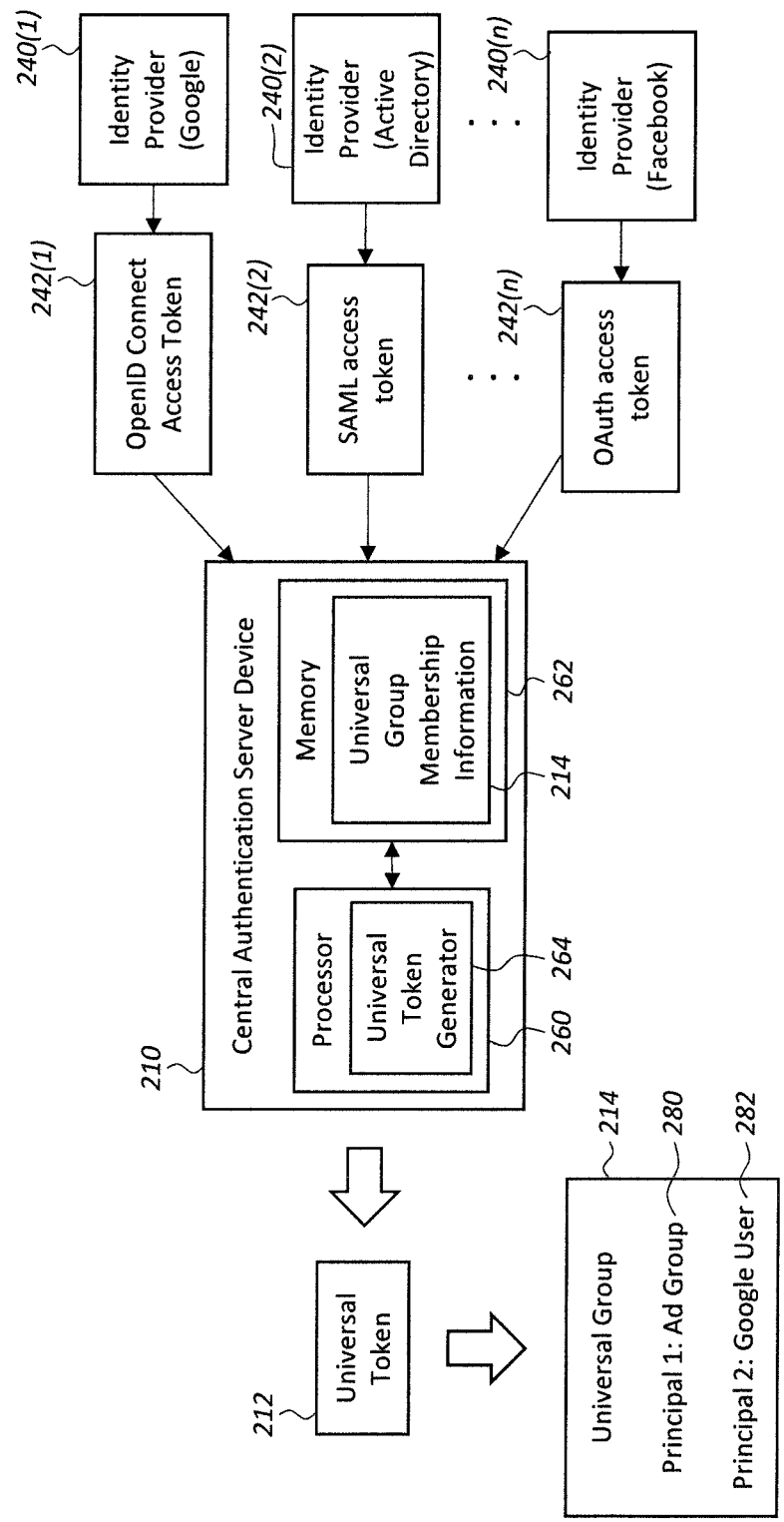
FIG. 3 is a simplified overview on operation of a central authentication service providing universal tokens with group membership information on members from different types of identity providers in which various aspects of the disclosure may be implemented.

Referring now to FIG. 3, an overview of the central authentication service 210 will be discussed. The central authentication service 210 is for authentication of a user operating a computing device requesting access to a service provider. The central authentication service 210 includes a processor 260 and a memory 262 coupled to the processor. The processor 260 includes a universal token generator 264 for generating the universal tokens 212, and the memory 262 stores group membership information 214 to be included with the universal tokens 212.

In operation, the central authentication service 210 receives access tokens that may be generated by different types of identity providers 240(1)-240(n). The different types of identity providers 240(1)-240(n) may be generally referred to as identity providers 240. How the central authentication service 210 receives the access tokens 242(1)-242(n) depend on the authentication protocols used by the different types of identity providers 242(1)-242(n). The access tokens 242(1)-242(n) may be generally referred to as access tokens 242.

For OpenID Connect and OAuth authentication protocols, for example, the central authentication service 210 receives the access token from the corresponding identity provider. For SAML authentication protocols, for example, the central authentication service 210 receives the access token from the computing device requesting access to the service provider.

The identity providers 240(1)-240(n) may support Active Directory, Google, Facebook, Okta, and others, for example. Each identity provider 240(1)-240(n) has an authentication protocol associated therewith, such as OpenID Connect, OAuth, SAML, ADFS, or others, for example.

In the illustrated example, identity provider 240(1) supports Google users by generating access tokens 242(1) using the OpenID Connect authentication protocol; identity provider 240(2) supports active directory users by generating access tokens 242(2) using the SAML authentication protocol; and identity provider 240(*n*) supports Facebook users by generating access tokens 242(*n*) using the OAuth authentication protocol.

In addition or as an alternative to the identity providers for Google, active directory and Facebook, other types of identity providers may be used. The central authentication service 210 supports many other identity providers in addition to those provided in FIG. 3, as readily appreciated by those skilled in the art.

Universal groups within the central authentication service 210 may be generally defined by a system administrator, for example. A universal group may be made up of principals from different identity providers. In other embodiments, the universal group may be made up of principals from the same identity provider. Each principal within a universal group may be an individual user or a group of users.

To build universal groups, the users from different identity providers 240 need to have the corresponding principals in the central authentication service 210. The universal group 214 defined by the system administrator may include a group of active directory users, for example. In this case, the group of active directory users 280 is mapped to principal 1. The group of active directory users 280 may be accountants within a company that were hired before a set date. Each active directory user within this group uses the same identity provider.

For accountants hired after the set date, they may use a different identity provider. In this case, a new accountant who is a Google user 282 is mapped to principal 2. The system administrator groups principals 1 and 2 together so that principal 2 has the same access rights as principal 1.

When the central authentication service 210 generates a universal token 212, the group membership information 214 is included within the universal token 212. When the universal token 212 is provided to the service provider, the service provider is able to use the group membership information 214 to determine if the user of the computing device has permission to access desired services.

The access token 242 initially received by the central authentication service 210 may be generated by anyone of the different types of identity providers 240 associated with the at least one universal group. By replacing the access token 242 with the universal token 212, this allows the service provider to contact the central authentication service 210 for the universal token 212 to determine if the user has permission to access the desired services instead of contacting a particular identity provider 240 that initially generated the access token 242. This simplifies operation of the service provider since the service provider does not have to keep track of the many different types of identity providers 240. The service provider is now able to contact the central authentication service 210 for the universal token 212 regardless of the identity provider 240 that generated the initial access token 242.

The central authentication service 210 essentially operates as a broker by instructing the computing device to authenticate with its associated identity provider 240, and then replace the access token 242 generated by the identity provider 240 with the universal token 212. The central authentication service 210 advantageously allows a system administrator, for example, to provide group based delegation administration across different identity providers 240. This may be accomplished by having one type device, i.e., the central authentication service 210, allow for such a grouping of members across the different types of identity providers 240.

Figure 4:
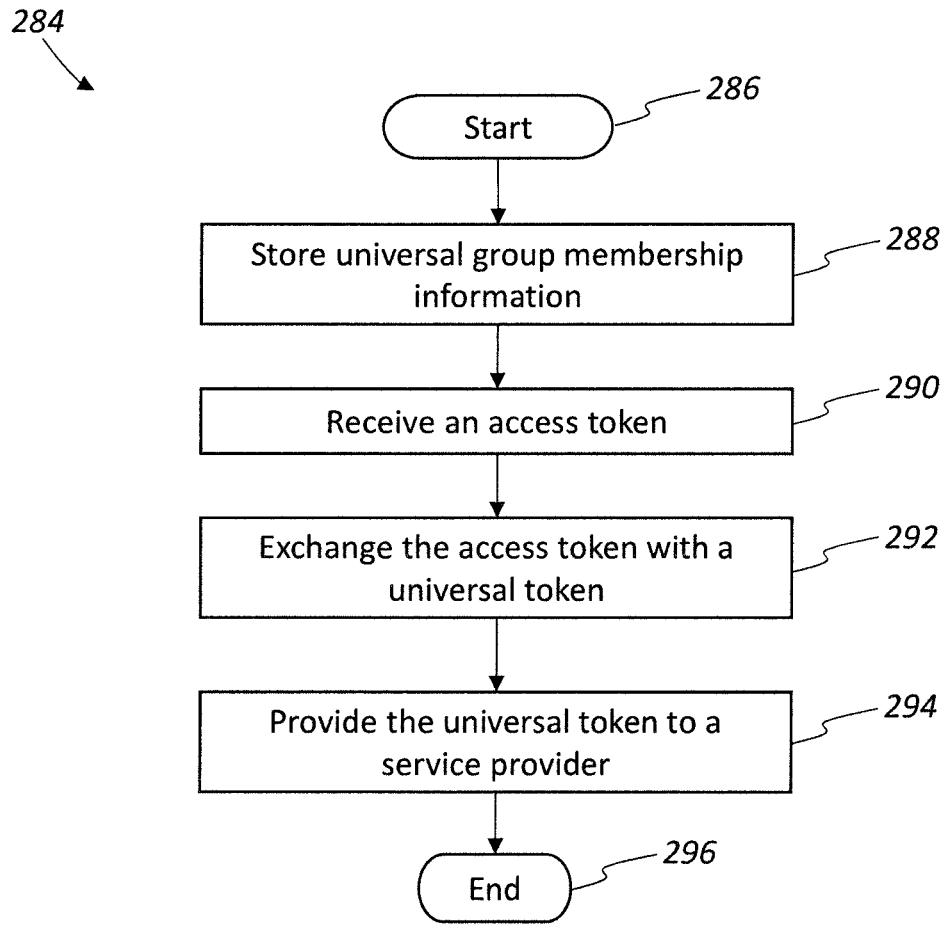
FIG. 4 is a general flowchart illustrating a method for operating the central authentication service illustrated in FIG. 3.

Referring now to the flowchart 284 in FIG. 4, and generally speaking, a method for operating a central authentication service 210 is provided. From the start (Block 286), universal group membership information 214 is stored at Block 404. The universal group membership information 214 may include information on users or principals from different identity providers 240. An access token 242 is received at Block 290. The access token 242 may be generated by an identity provider 240, for example. The access token 242 is exchanged with a universal token 212 at Block 292. The universal token 212 may include the universal group membership information 214. The universal token 212 may be provided to a service provider 230 at Block 294. The universal group membership information 214 on the universal token 212 allows the service provider 230 to determine if a user of a computing device 220 has permission to access desired services. The method ends at Block 296.

Figure 5:
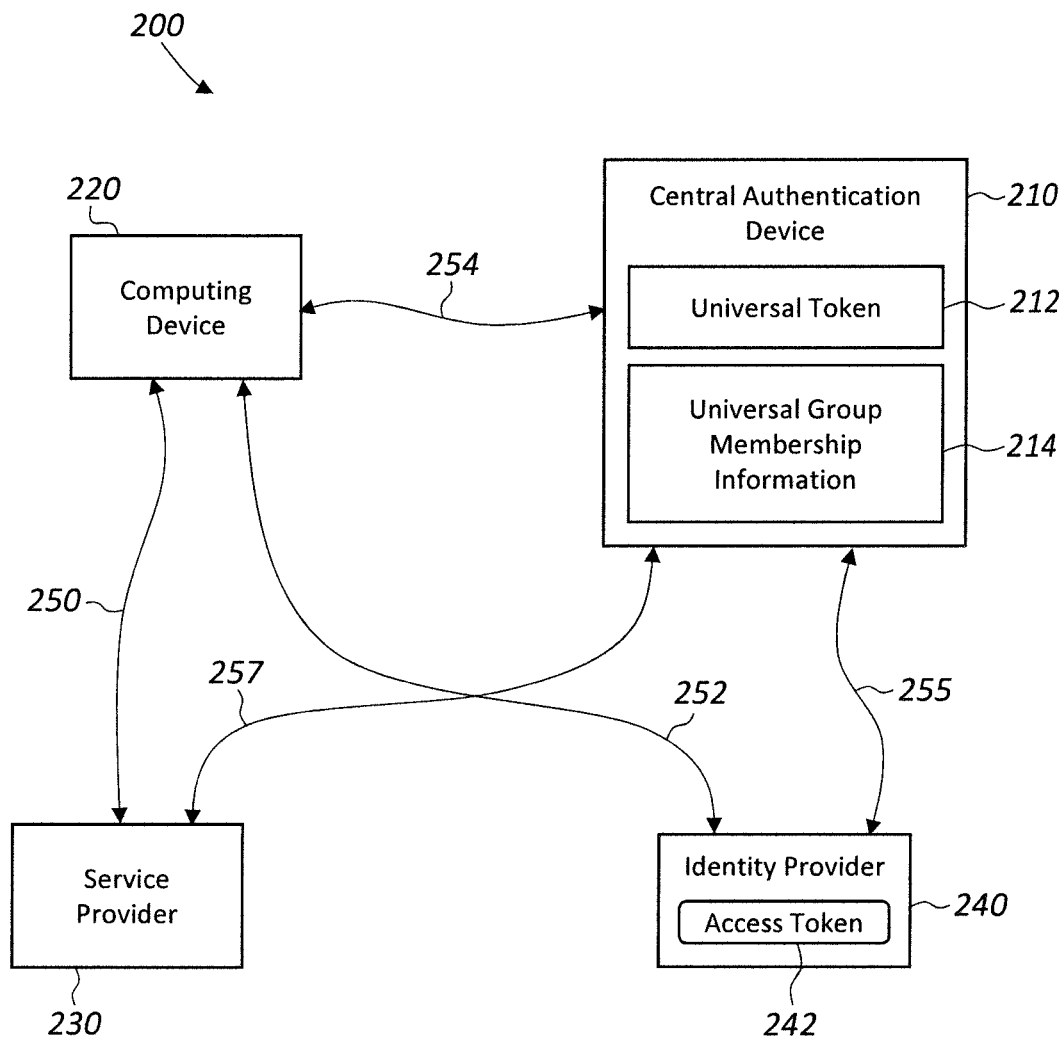
FIG. 5 is a simplified block diagram of another embodiment of a network environment including the central authentication service illustrated in FIG. 3.
Figure 6:
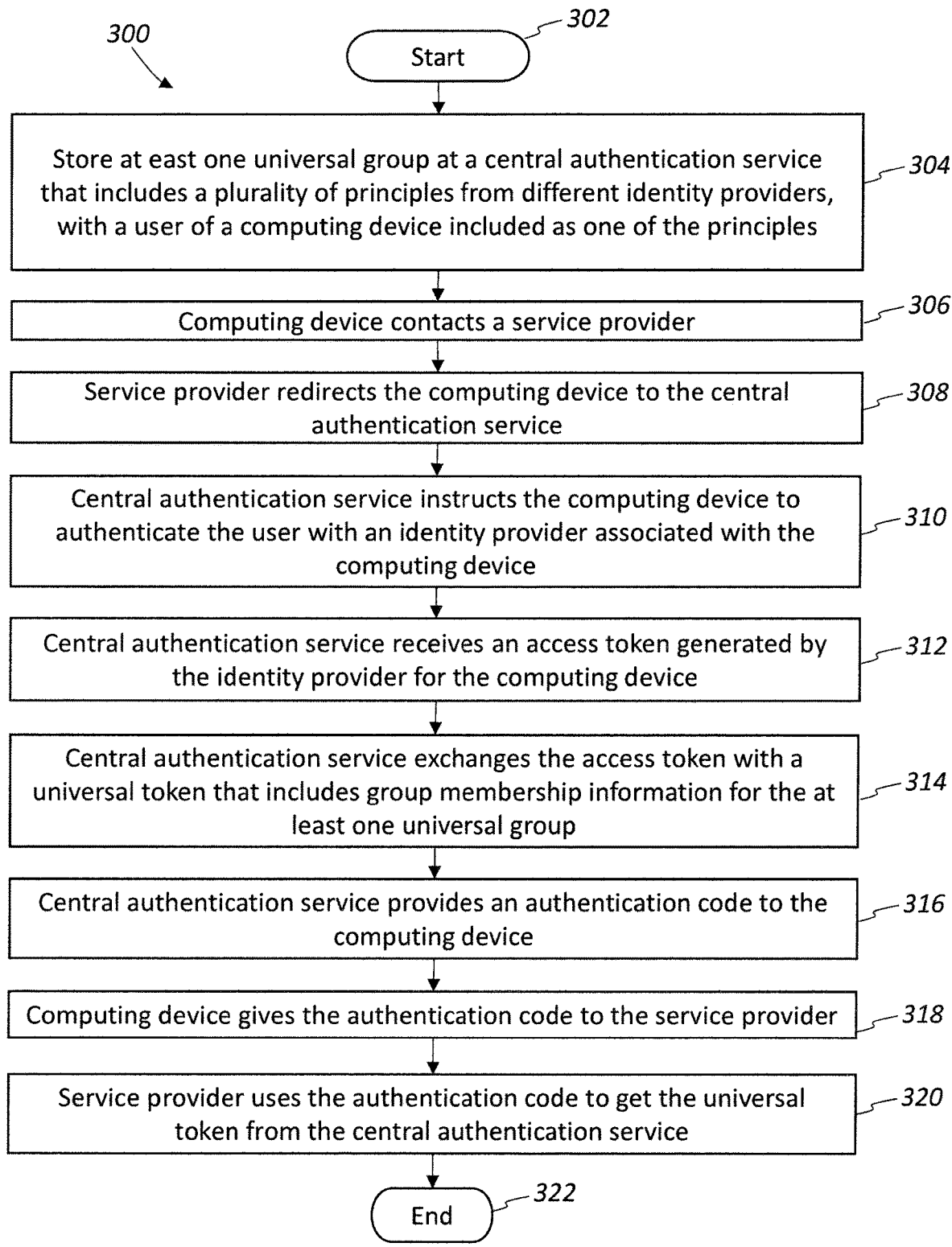
FIG. 6 is a more detailed flowchart illustrating a method for operating the central authentication service illustrated in FIG. 3.

Referring now to FIGS. 5 and 6, more detailed steps for authentication of a user operating a computing device 220 requesting access to a service provider 230 will be discussed. The computing device 220 is in communications with the service provider 230 via communications path 250, with an identity provider 240 via communications path 252, and with the central authentication service 210 via communications path 254. The service provider 230 is also in communications with the central authentication service 210 via communications path 257, and the central authentication service 210 may also be in communications with the identity provider 240 via communications path 255. The communications paths may be any combination of wireless and wired connections.

In the flowchart 300, from the start (Block 302), an administrator of the central authentication service 210 stores in the memory 262 at least one universal group 214 that includes a plurality of principals from different types of identity providers 240 at Block 304, with the user of the computing device 220 included as one of the principals.

The user of the computing device 220 would like to access a web site, for example. A web browser within the computing device 220 is in communications with the service provider 230 via communications path 250 at Block 306. The service provider 230 redirects the computing device 220 to the central authentication service 210 via communications path 250 at Block 308. The redirect includes the address of the central authentication service 210, a client ID of the service provider 230, and a return address for the service provider 230. The address may correspond to a Uniform Resource Identifier (URI), for example.

The central authentication service 210 instructs the computing device 220 via communications path 254 at Block 310 to authenticate the user with an identity provider 240 associated with the computing device 220. The central authentication service 210 provides the address of the identity provider 240, the client ID, and the return address for the central authentication service 210 to the computing device 220. The identity provider 240 provides a consent page to the computing device 220 where the user enters a user name and password.

The central authentication service 210 receives an access token 242 generated by the identity provider 240 at Block 312. The access token 242 includes information on the user of the computing device 220, such as username and email address, for example.

How the central authentication service 210 receives the access token 242 depends on the authentication protocol used by the identity provider 240. For OpenID Connect and OAuth authentication protocols, for example, the central authentication service 210 receives the access token 242 from the corresponding identity provider 240 via communications path 255. These authentication protocols involve the central authentication service 210 also receiving a refresh token since the access token has an expiration. For SAML authentication protocols, for example, the central authentication service 210 receives the access token 242 from the computing device 220. For this authentication protocol, a refresh token is not needed.

The central authentication service 210 exchanges the access token 242 with a universal token 212 that includes group membership information 214 for the at least one universal group at Block 314. The central authentication service 210 transfers the user information (e.g., username and email address) from the access token 242 to the universal token 212.

The central authentication service 210 provides an authentication code to the computing device 220 at Block 316. The computing device 220 gives the authentication code to the service provider 230 at Block 318. The service provider 230 uses the authentication code to get the universal token 212 from the central authentication service 210 at Block 320. The method ends at Block 322.

By replacing the access token 242 with the universal token 212, this allows the service provider 230 to contact the central authentication service 210 for the universal token 212 to determine if the user has permission to access the desired services instead of contacting a particular identity provider 240 that initially generated the access token 242. This simplifies operation of the service provider 230 since the service provider 230 does not have to keep track of the many different types of identity providers 240.

The central authentication service 210 essentially operates as a broker by instructing the computing device 220 to authenticate with its associated identity provider 240, and then replace the access token 242 generated by the identity provider 240 with the universal token 212. The central authentication service 210 advantageously allows a system administrator, for example, to provide group based delegation administration across different identity providers.

The user of the computing device 220 may be principal 2 within the example user group. In this case, the identity provider 240 is configured to support Google users based on the OpenID Connect authentication protocol.

The authentication protocol used by the central authentication service 210 for the universal token 212 is predetermined by the central authentication service 210 regardless of the authentication protocol used by the identity provider 240 for the access token 242. In other words, the authentication protocol associated with the universal token 212 is not based on the authentication protocol used with the access token 242.

In some embodiments, the authentication protocol associated with the universal token 212 may be the same as the authentication protocol used by the identity provider 240. In other embodiments, the authentication protocol associated with the universal token 212 may be different from the authentication protocol used by the identity provider 240. In the illustrated example, the authentication protocol associated with the universal token 212 may be Active Directory Federation Services (ADFS), and the authentication protocol associated with the access token 242 for principle 2 is OpenID Connect.

Since principals 1, 2 and 3 are each a member of the universal group, they are permitted by the system administrator to access certain services from the security provider 230, for example. These services may be restricted to other users that are not members of the universal group. These services may include access to certain web pages, for example.

Even though each principal is associated with a different authentication protocol, they are all within the same universal group. This advantageously allows a system administrator within the company to provide group based delegation administration across different identity providers 240. This is accomplished by having one type device, i.e., the central authentication service 210, allow for such a grouping of members across different identity providers 240. The central authentication service 210 avoids having to provide various subsystems to support the many different types of identity providers 240.

The service provider 230 will validate the universal token 212 with the group membership information 214. Since the universal token 212 includes the group membership information 214, the service provider 230 knows if the user of the computing device 220 has permission to access the desired services, i.e., web pages. The service provider 230 is able to make this determination on group membership for the user (i.e., principal 2) of the computing device 220 without having to contact the identity provider 240 or the central authentication service 210 after having received the universal token 212.

Otherwise, if the group membership information 214 was not included in the universal token 212, then the service provider 230 would need to contact the identity provider 240 or the central authentication service 210. The universal token 212 with the group membership information 214 thus simplifies operation of the service provider 230.

Alternatively, another embodiment may be directed to the group membership information 214 not being included in the universal token 212. This situation may be applicable when the group membership information 214 is too large, for example. The service provider 230 is to contact the central authentication service 210 for the group membership information 214 after receiving the universal token 212.

In addition, the processor 260 within the central authentication service 210 may be used to encrypt the universal token 212. The encryption may be based on a public/private key pair encryption, a shared key encryption, and a JSON Web Encryption (JWE), for example.

Yet another aspect is directed to a non-transitory computer readable medium for a central authentication service 210 used in authenticating a user operating a computing device 220 requesting access to a service provider 230. The non-transitory computer readable medium has a plurality of computer executable instructions for causing the central authentication service 210 to perform steps comprising storing at least one universal group 214 that includes a plurality of principals from different identity providers 240, with the user of the computing device 220 included as one of the principals; receiving an access token 242 generated by an identity provider 240 associated with the computing device 220; generating a universal token 212 that includes group membership information for the at least one universal group 214; exchanging the access token 242 with the universal token 212; and providing an authentication code to the computing device 220, with the computing device 220 then providing the authentication code to the service provider 230. The universal token 212 is provided to the service provider 230 upon receipt of the authentication code from the service provider 230, with the group membership information 214 on the universal token 212 to allow the service provider 240 to determine if the user of the computing device 220 has permission to access desired services.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A central authentication device for authentication of users operating respective computing devices requesting access to a service provider, the central authentication device comprising:
    a memory; and
    a processor coupled to said memory and configured to perform the following
        store in said memory at least one universal group that includes a plurality of principals from different types of identity providers, with the users operating the respective computing devices included as principals in the universal group and having the same access rights,
        receive access tokens generated by the different types of identity providers associated with the respective computing devices, with the identity providers being separate from the respective computing devices,
        generate a respective universal token that is to be shared by the principals within the at least one universal group, with each respective universal token including group membership information for the at least one universal group,
        exchange the access tokens with the respective universal tokens,
        provide a respective authentication code to the respective computing devices after the exchange, with the respective computing devices then providing the respective authentication codes to the service provider, and
        provide the respective universal tokens to the service provider upon receipt of the respective authentication codes from the service provider, with the group membership information on the universal token to allow the service provider to determine if the users of the respective computing devices have permission to access desired services.

2. The central authentication device of claim 1 wherein said processor receives at least one of the access tokens directly from one of the identity providers.

3. The central authentication device of claim 2 wherein the access token is based on at least one of an OpenID Connect (OIDC) authentication protocol and an OAuth authentication protocol.

4. The central authentication device of claim 1 wherein at least one of the computing devices receives the access token after authentication with one of the identity providers; and wherein said processor receives the access token from the at least one of the computing devices.

5. The central authentication device of claim 4 wherein the access token is based on a Security Markup Language (SAML) authentication protocol.

6. The central authentication device of claim 1 wherein each respective universal token is based on a universal authentication protocol; and wherein at least one of the authentication protocols used by at least one of the different identity providers to generate at least one of the access tokens is different from the universal authentication protocol.

7. The central authentication device of claim 1 wherein each respective universal token is based on a universal authentication protocol; and wherein at least one of the authentication protocols used by at least one of the different identity providers to generate at least one of the access tokens is the same as the universal authentication protocol.

8. The central authentication device of claim 1 wherein said processor is further configured to encrypt the respective universal tokens.

9. The central authentication device of claim 8 wherein the encryption is based on at least one of public/private key pair encryption, shared key encryption, and JSON Web Encryption (JWE).

10. A method for operating a central authentication device for authentication of users operating a respective computing devices requesting access to a service provider, the method comprising:
    storing at least one universal group that includes a plurality of principals from different types of identity providers, with the users operating the respective computing devices included as principals in the universal group and having the same access rights;
    receiving access tokens generated by the different types of identity providers associated with the respective computing devices, with the identity providers being separate from the respective computing devices;
    generating a respective universal token that is to be shared by the principals within the at least one universal group, with each respective universal token including group membership information for the at least one universal group;
    exchanging the access tokens with the respective universal tokens;
    providing a respective authentication code to the respective computing devices after the exchange, with the respective computing devices then providing the respective authentication codes to the service provider, and
    providing the respective universal tokens to the service provider upon receipt of the respective authentication codes from the service provider, with the group membership information on the universal token to allow the service provider to determine if the users of the respective computing devices have permission to access desired services.

11. The method of claim 10 wherein at least one of the access tokens is received directly from one of the identity providers.

12. The method of claim 10 wherein at least one of the computing devices receives the access token after authentication with one of the identity providers; and the method further comprising receiving the access token from the at least one computing device.

13. The method of claim 10 wherein each respective universal token is based on a universal authentication protocol; and wherein at least one of the authentication protocols used by at least one of the different identity providers to generate at least one of the access tokens is different from the universal authentication protocol.

14. The method of claim 10 wherein each respective universal token is based on a universal authentication protocol; and wherein at least one of the authentication protocols used by at least one of the different identity providers to generate at least one of the access tokens is the same as the universal authentication protocol.

15. The method of claim 10 further comprising encrypting the respective universal tokens.

16. A non-transitory computer readable medium for a central authentication device for authentication of a user operating a computing device requesting access to a service provider, with the non-transitory computer readable medium having a plurality of computer executable instructions for causing the central authentication device to perform steps comprising:

storing at least one universal group that includes a plurality of principals from different types of identity providers, with the user of the computing device included as one of the principals;

receiving an access token generated by an identity provider associated with the computing device, with the identity providers being separate from the respective computing devices;

generating a universal token that includes group membership information for the at least one universal group;

exchanging the access token with the universal token;

providing a respective authentication code to the respective computing devices after the exchange, with the respective computing devices then providing the respective authentication codes to the service provider, and providing the universal token to the service provider upon receipt of the authentication code from the service provider, with the group membership information on the universal token to allow the service provider to determine if the user of the computing device has permission to access desired services.

17. The non-transitory computer readable medium of claim 16 wherein at least one of the access tokens is received directly from one of the identity provider.

18. The non-transitory computer readable medium of claim 16 wherein at least one of the computing devices receives the access token after authentication with one of the identity providers; and further comprising receiving the access token from the at least one of the computing devices.

19. The non-transitory computer readable medium of claim 16 wherein each respective universal token is based on a universal authentication protocol; and wherein at least one of the authentication protocols used by at least one of the different identity providers to generate at least one of the access tokens is different from the universal authentication protocol.

20. The non-transitory computer readable medium of claim 16 further comprising encrypting the respective universal tokens.

* * * * *